(12) United States Patent
Verbrugge et al.

(10) Patent No.: US 9,337,484 B2
(45) Date of Patent: May 10, 2016

(54) ELECTRODES HAVING A STATE OF CHARGE MARKER FOR BATTERY SYSTEMS

(75) Inventors: Mark W. Verbrugge, Troy, MI (US); Ping Liu, Irvine, CA (US); Elena Sherman, Culver City, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 643 days.

(21) Appl. No.: 12/465,102

(22) Filed: May 13, 2009

(65) Prior Publication Data
US 2010/0291416 A1  Nov. 18, 2010

(51) Int. Cl.
*H01M 4/48* (2010.01)
*H01M 4/485* (2010.01)
*H01M 4/36* (2006.01)
*H01M 4/58* (2010.01)
*H01M 4/587* (2010.01)
*H01M 10/0525* (2010.01)

(52) U.S. Cl.
CPC .............. *H01M 4/485* (2013.01); *H01M 4/364* (2013.01); *H01M 4/587* (2013.01); *H01M 4/5825* (2013.01); *H01M 10/0525* (2013.01); *Y02E 60/122* (2013.01)

(58) Field of Classification Search
USPC ........... 429/231.1, 221, 218.1, 231.8, 231.95, 429/231.9, 50, 209; 320/162, 134
See application file for complete search history.

(56) References Cited

U.S. PATENT DOCUMENTS

| | | | |
|---|---|---|---|
| 2006/0134520 A1* | 6/2006 | Ishii et al. ...................... | 429/223 |
| 2007/0148545 A1* | 6/2007 | Amine et al. .............. | 429/231.1 |
| 2009/0301866 A1* | 12/2009 | Zaghib et al. ................. | 204/242 |
| 2010/0171466 A1* | 7/2010 | Spitler et al. ................... | 320/134 |
| 2010/0285362 A1* | 11/2010 | Christensen et al. .... | 429/231.95 |
| 2011/0084229 A1* | 4/2011 | Kawakami et al. ........ | 252/182.1 |

FOREIGN PATENT DOCUMENTS

| | | | |
|---|---|---|---|
| WO | 2003075371 A2 | 9/2003 | |
| WO | WO 2007/087714 | * 8/2007 | ............ H01M 10/24 |

OTHER PUBLICATIONS

Thierry Brousse, et al. TiO2 (B) /Activated Carbon Non-Aqueous Hybrid System for Energy Storage, Journal of Power Sources 158 (2006) 571-577, www.elsevier.com/locate/jpowsour, 7 pages.
John Christensen, et al., "Optimization of Lithium Titanate Electrodes for High-Power Cells, Journal of Electrochemical Society", 153 (3) A560-A565 (2006), 13 pages.
K.M. Colbow, et al., "Structure and Electrochemistry of the Spinel Oxides LiTi2O4 and Li4/3Ti5/3O4", Journal of Power Sources, 26 (1989) 397-402, 6 pages.
Jinyoung Kim, et al., "Spinel Li4Ti5)12 Nanowires for High-Rate Li-Ion Intercalation Electrode", Electrochemical and Solid-State Letters, 10 (3) A81-A84 (2007), 4 pages.
Junrong Li, et al., "Controllable Formation and Electrochemical Properties of One-Dimensional Nanostructured Spinel Li4Ti5)12", Electrochemistry Communications 7 (2005) 894-899, 6 pages.
A. Guerfi, et al., "Nano-particle Li4Ti5)12 Spinel as Electrode for Electrochemical Generators", Journal of Power Sources 119-121 (2003) 88-94, 7 pages.
Yanjing Hao, Synthesis by Tea Sol-Gel Method and Electromechanical Properties of Li4Ti5O12 Anode Material for Lithium-Ion Battery, Solid State Ionics 176 (2005) 1201-1206, 6 pages.
Daniel R. Baker, et al., "Temperature and Current Distribution in Thin-Film Batteries", Journal of Electrochemical Society, 146 (7) 2413-2424 (1999) 12 pages.
Mark W. Verbrugge, et al., "Electrochemical Analysis of Lithiated Graphite Anodes", Journal of Electrochemical Society, 150 (3) A374-A384 (2003), 11 pages.
Michel Letellier, et al., "In Situ 7Li NMR During Lithium Electrochemical Insertion into Graphite and a Carbon/Carbon Composite", Journal of Physics and Chemistry of Solids 67 (2006) 1228-1232, 5 pages.
Kim Kinoshita, et al., "Negative Electrodes for Li-Ion Batteries", Lawrence Berkeley National Laboratory, 1 Cyclotron Rd., Berkeley, CA 94720, 18 pages.
Author Unknown, "Citation Errors Concerning the First Report on Exfoliated Graphite", ScienceDirect, Carbon 45 (2007), 1381-1383, 3 pages.
Tsutomu Ohzuku, et al., "Zero-Strain Insertion Material of Li[Li1/3Ti5/3]O4 for Rechargeable Lithium Cells", J. Electrochem. Soc., vol. 142, No. 5, May 1995, 5 pages.
M. Wagemaker, et al., "Thermodynamics of Spinel LixTiO2 from First Principles", Chemical Physics 317 (2005) 13-136, 7 pages.
Mark W. Verbrugge, et al., Electrochemical Characterization of High-Power Lithium Ion Batteries Using Triangular Voltage and Current Excitation Sources, ScienceDirect, Journal of Power Sources 174 (2007) 2-8, 7 pages.
German Office Action dated Apr. 8, 2014 ; Application No. 102010019984.2 ; Applicant : GM Global Technology Operations LLC ; 5 pages.

\* cited by examiner

*Primary Examiner* — Raymond Alejandro
(74) *Attorney, Agent, or Firm* — BrooksGroup

(57) ABSTRACT

One embodiment includes a battery cell electrode having a first material constructed and arranged to be charged and discharged and having a first potential versus state of charge relationship; a second material having a second potential versus state of charge relationship; wherein said second material is constructed and arranged to become active to transfer ions at a selected state of charge level to produce an observable change in measured potential from said first to said second potential versus relationship, and wherein the amount of the second material ranges from about 2 to about 30 weight percent of the battery cell electrode.

16 Claims, 3 Drawing Sheets

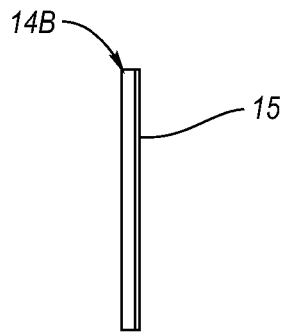
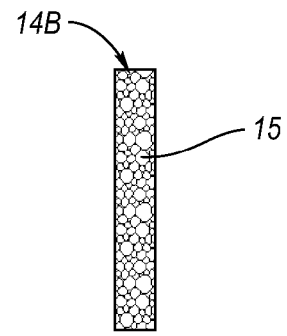
*Fig. 3A*   *Fig. 3B*
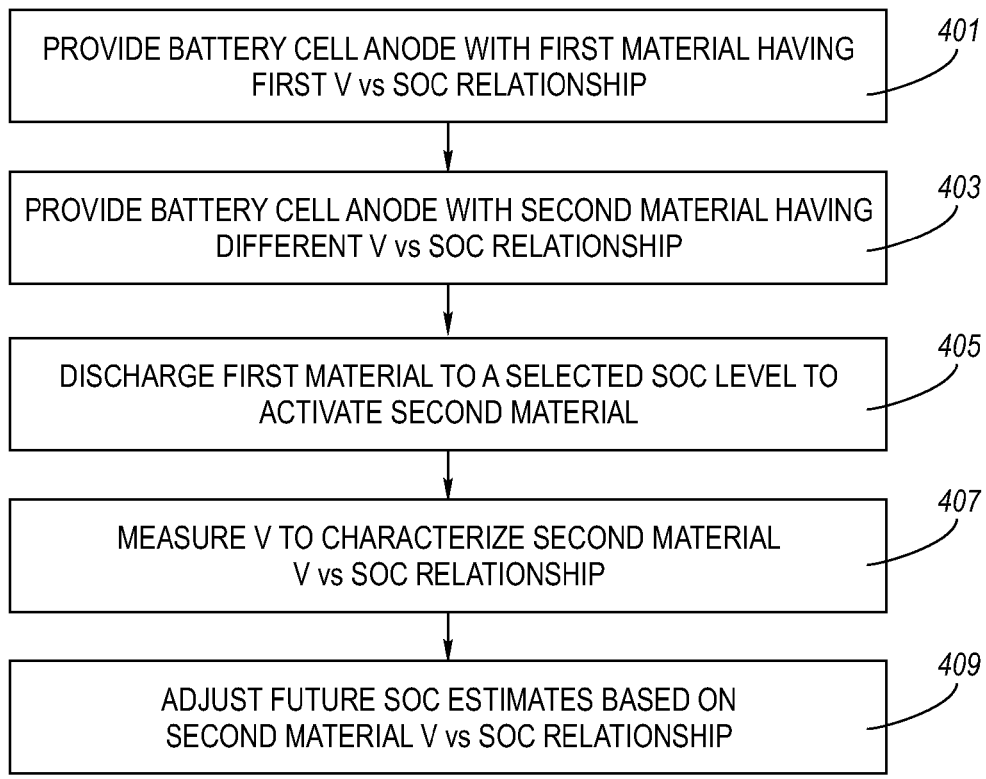
*Fig. 4*

ELECTRODES HAVING A STATE OF CHARGE MARKER FOR BATTERY SYSTEMS

TECHNICAL FIELD

The field to which the disclosure relates includes electrodes and methods for determining a state of charge (SOC) in a battery system including a lithium ion battery system.

BACKGROUND

Lithium-ion batteries are a type of rechargeable battery in which a lithium ion moves between a negative electrode and a positive electrode. Lithium ion batteries are commonly used in consumer electronics. In addition to uses for consumer electronics, lithium-ion batteries are growing in popularity for defense, automotive, medical, and aerospace applications due to their high energy density.

SUMMARY OF EXEMPLARY EMBODIMENTS OF THE INVENTION

One exemplary embodiment includes a battery cell electrode including a first material having a first potential versus state of charge (SOC) relationship; a second material having a second potential versus state of charge (SOC) relationship; wherein the second material becomes active to transfer ions at a selected SOC level to result in a readily observable change in measured potential from the first to the second potential versus SOC relationship.

Another exemplary embodiment includes a battery cell including an anode electrode and a cathode electrode; the anode electrode including a first material having a first measured potential versus state of charge (SOC) relationship; and the anode electrode including a second material having a second measured potential versus state of charge (SOC) relationship; wherein the second material becomes active to transfer ions at a selected SOC level to result in a readily observable change in measured potential from the first to the second potential versus SOC relationship. We use the term anode to refer to the negative electrode (the anode on cell discharge). Similarly, the cathode refers to the positive electrode, which is the cathode on discharge.

Yet another exemplary embodiment includes a method of improving determination of state of charge (SOC) of a battery cell including an anode electrode and a cathode electrode; providing the anode electrode comprising a first material having a first measured potential versus state of charge (SOC) relationship; and providing the anode electrode including a second material having a second measured potential versus state of charge (SOC) relationship; wherein the second material is selected to become active to transfer ions at a selected SOC level to result in a readily observable change in measured potential from the first to the second potential versus SOC relationship; and using the readily observable change in measured potential from said first to said second potential versus SOC relationship to adjust future estimates of state of charge (SOC).

Other exemplary embodiments will become apparent from the detailed description provided hereinafter. It should be understood that the detailed description and specific examples, while disclosing exemplary embodiments, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIGS. 3A and 3B shows exemplary arrangements of SOC marker additive material to an exemplary anode.

FIG. 4 shows an exemplary process flow according to exemplary embodiments.

DETAILED DESCRIPTION OF EXEMPLARY EMBODIMENTS

The following description of the embodiment(s) is merely exemplary (illustrative) in nature and is in no way intended to limit the invention, its application, or uses.

In one embodiment, a material additive may be added to an anode of a battery cell (system) that may produce a desired relationship between a battery cell potential (voltage) measurement and a state of charge (SOC) of the battery cell upon charge and/or discharge of the battery cell.

In some embodiments, the material additive (also referred to herein as an SOC marker) to the anode may cause a relatively significant change in a potential measurement (e.g., $1^{st}$ derivative or rate of potential change) versus SOC and may be readily observable, such as a step change in measured potential, compared to a relatively flat potential measurement versus SOC battery cell in an anode without the material additive.

In some embodiments, the battery cell may be a lithium ion battery cell. In some embodiments, the lithium ion battery cell may include a liquid electrolyte and or gel electrolyte. In some embodiments, the lithium ion battery cell may be a prismatic lithium ion battery cell.

In some embodiments, the battery cell may be one of a plurality of battery cells in a bank of battery cells connected in series. In other embodiment, the battery cell may be a portion of a vehicle battery system such as for providing power in an electric or hybrid vehicle.

Figure 1:
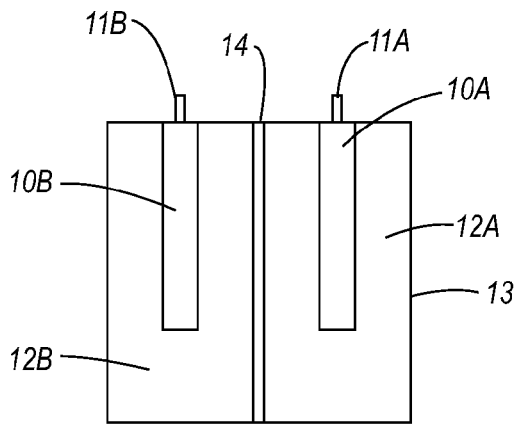
FIG. 1A is a schematic view of an exemplary Lithium ion battery cell according to the prior art.
FIG. 1B is a schematic view of a conventional battery cell anode/cathode pair versus a battery cell anode/cathode pair according to an exemplary embodiment.

For example, referring to FIG. 1A is shown a schematic view of an exemplary lithium-ion battery cell having a solid state cathode 10A which may be surrounded by an electrolyte 12A and separated from a solid state anode 10B surrounded by an electrolyte 12B (liquid or gel) by a separator 14 (e.g., which may include a polymer such as polyethylene or polypropylene), and may allow the passage of Li ions. Cathode and anode electrical leads e.g., 11A and 11B may extend outside a container e.g., 13 and which may be connected in series with other cells to form a battery pack. It will be appreciated that in some embodiments, the container 13 may include a stiff or flexible polymer material and may include a laminate including an inner laminated metal foil.

In some embodiments, the potential measurement may be expressed as measured potential vs. lithium (Li). In other embodiments, additionally or alternatively, the measured potential may be an open circuit potential measurement of the battery cell.

In one embodiment, the lithium ion battery cell may include an iron phosphate cathode (e.g., $Li_xFePO_4$ where $0<x<1$ between a charged and discharged state, respectively) and may include a graphite anode (e.g., $Li_yC_6$ where $0<Y<1$ between a discharged and charged state, respectively). In one embodiment the cathode may include lithium metal oxides such as, but not limited to, lithium oxides including cobalt, nickel, manganese and/or or other elements.

In one embodiment, the material additive to the anode may be a lithium titanate. In another embodiment the lithium titanate may be $Li_{4+3z}Ti_5O_{12}$ where $0<z<1$.

For typical designs of a thin film battery and problems of current distribution and temperature distribution. Because the current is highest near the tabs, so are the $i^2R$ (ohmic) losses, and the temperature is highest there. Hence, in one embodiment very durable lithium titanate may be placed substantially only at the top of the cell by the connecting tabs.

Figure 1B:
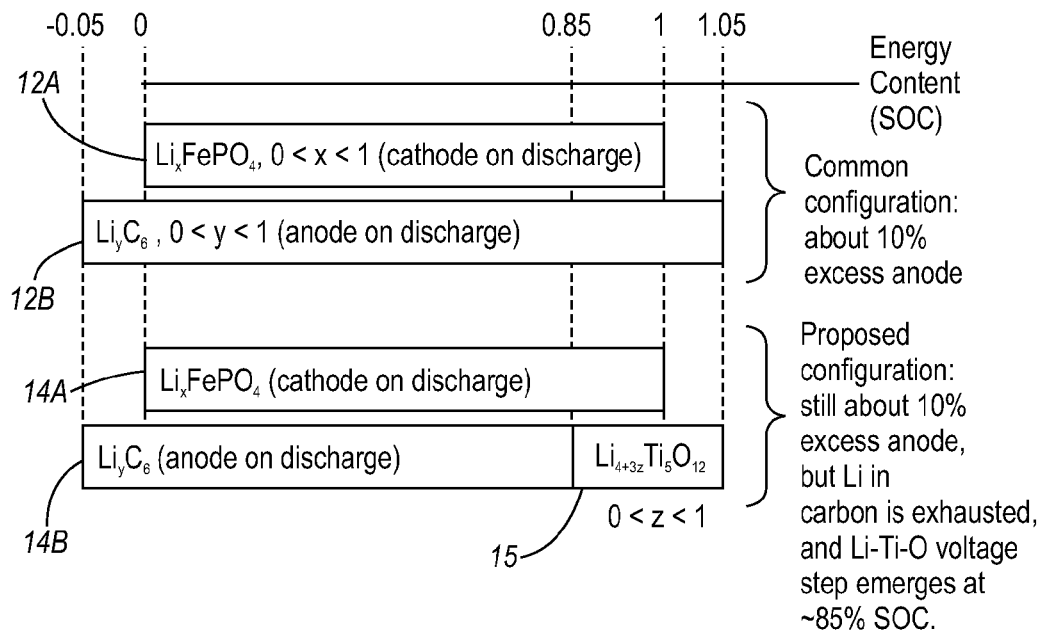

For example, referring to FIG. 1B is shown a schematic diagram of energy content (state of charge (SOC)) of a graphite anode 12B and iron phosphate cathode 12A battery cell without a material additive included in the graphite anode compared to a battery cell graphite anode 14B with a material additive 15 such as $Li_{4+3z}Ti_5O_{12}$ and cathode 14A. As shown, the anode in either battery cell may include about a 10% excess energy content (SOC) (e.g., ~0.05-1.05) compared to the cathode.

In one embodiment, in operation, upon discharge of the anode 14B, the Li in the graphite anode may be exhausted at a selected level of discharge, at which time the anode material additive (e.g., lithium titanate) may become active (e.g., engage in Li ion transfer) to thereby cause a readily observable change in measured potential of the battery cell system (e.g., a step change) which may be related to a SOC value.

It will be appreciated that the level of discharge of the anode or SOC where a change in the measured potential occurs of the battery system (where SOC marker becomes active) may depend on the type of additive material as well as the relative amounts of the material additive and/or the relative amount of lithium contained in (complexed with) the anode and the material additive. In one embodiment the amount of the additive may range from about 2 to about 30 weight percent of the anode composition. The anode may include additional materials such as, but not limited to, carbon, for example in the form of hard (non-graphitizable) carbon, soft carbon (graphitizable upon heating) and/or graphite.

In some embodiments, the readily observable change (e.g., step change) in the measured potential may be selected to occur at SOC levels between about 0.05 and about 0.95, in other embodiments at SOC levels between about 0.05 and about 0.5, and in yet other embodiments at SOC levels between about 0.1 and about 0.3.

Figure 2A:
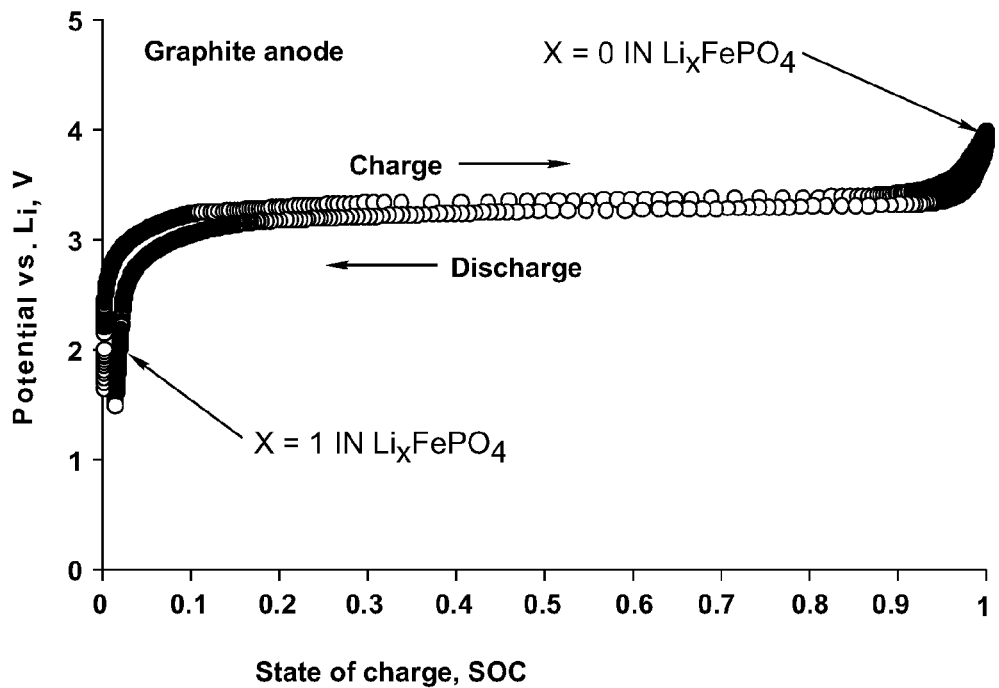
FIG. 2A is a graph showing a potential versus state of charge (SOC) relationship for a conventional cell employing a graphite anode and an iron phosphate cathode according to the prior art.
Figure 2B:
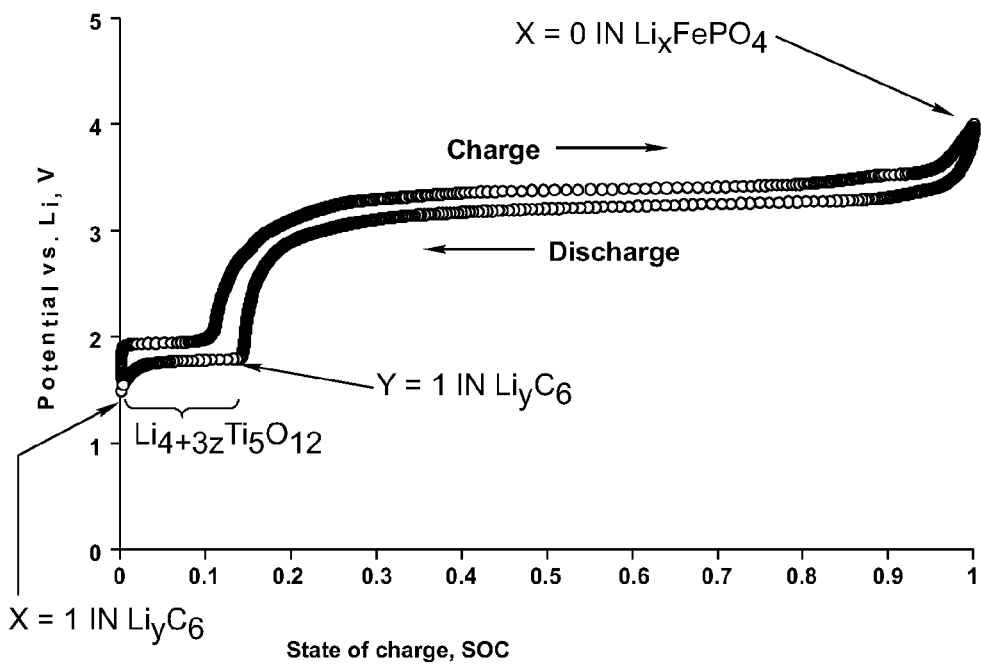
FIG. 2B is a graph showing a potential versus state of charge (SOC) relationship for a conventional cell employing a graphite anode with a lithium titanate additive SOC marker to the anode according to an exemplary embodiment.

In one embodiment, referring to FIGS. 2A and 2B, is shown the measured potential versus SOC for a graphite/iron phosphate (anode/cathode) battery cell without (FIG. 2A) a potential changing material additive (SOC marker) in the anode and with (FIG. 2B) a potential changing material additive in the anode such as $Li_{4+3z}Ti_5O_{12}$.

In FIG. 2A is shown a conventional charge/discharge cycle e.g., at 0.25 mA or C/5 (e.g., 5 hour duration for full charge or discharge) for a graphite/iron phosphate (anode/cathode) battery cell without a potential changing material additive (SOC marker) in the anode. It is seen that the rate of change of the measured potential versus SOC is relatively flat between about 0.05 SOC and 0.95 SOC. It will be appreciated that such a flat potential versus SOC may make operation of SOC estimators (state estimators), as are known in the art, less accurate.

Referring to FIG. 2B, in contrast, according to an embodiment, when a lithium titanate (e.g., $Li_{4+3z}Ti_5O_{12}$) is added to the graphite anode, a significant change in the measured potential versus SOC may occur at a selected level of SOC, e.g., resulting in a step change in measured potential versus SOC. In the embodiment shown, the step change in potential (operation of SOC marker) occurs at about 15% (0.15) SOC (85% (0.85) depth of discharge) upon discharging (where y=0 in $Li_yC_6$) and at about 10% (0.1) SOC upon charging. Thus, a relatively non-flat potential versus SOC relationship (e.g., including a step change) may be selectively established according to embodiments to improve the accuracy of future SOC estimates by SOC estimators which may estimate SOC based on a potential measurement, as are known in the art.

In the embodiment shown in FIG. 2B, the lithium titanate has a capacity of about 0.25 mAh and the graphite has a capacity of about 0.95 mAh, while the iron phosphate has a capacity of about 1.1 mAh, thus making the energy content of the composite anode about 10% excess.

Referring to FIG. 3A, in one embodiment the potential changing material additive 15 to the anode electrode 14B may be disposed as a separate layer or separate layers of material together with the first anode material.

Referring to FIG. 3B, in other embodiments, the potential changing material additive 15 to the anode electrode 14B may be disposed as a second phase e.g., as grains or discrete particles within the first anode material, where the grains or particles may or may not be interconnected.

In other embodiments, the potential changing material additive to the anode electrode may be disposed in physical proximity according to any geometry with respect to the anode material.

Referring to FIG. 4 is a process flow diagram according to embodiments. In step 401 an anode in a battery cell may be provided with a first material with a first potential (Voltage) versus SOC relationship. In step 403 the anode may be provided with a second material having a second different potential (Voltage) versus SOC relationship. In step 405, the first material may be discharged to a selected SOC level to activate the second material to transfer ions. In step 407 a potential (Voltage) of the anode may be measured to characterize second potential (Voltage) vs. SOC relationship. In step 409, future estimates of SOC may be adjusted based on said second potential (Voltage) vs. SOC relationship.

The above description of embodiments of the invention is merely exemplary in nature and, thus, variations thereof are not to be regarded as a departure from the spirit and scope of the invention.

What is claimed is:

1. A battery cell electrode comprising:
   a first material constructed and arranged to be charged and discharged and having a first potential versus state of charge relationship;
   a second material comprising $Li_{4+3z}Ti_5O_{12}$ wherein $0<Z<1$ and having a second potential versus state of charge relationship;
   wherein said second material is constructed and arranged to become active to transfer ions at a selected state of charge level to produce an observable change in measured potential from said first to said second potential versus state of charge relationship, and wherein the amount of the second material ranges from about 2 to about 30 weight percent of the battery cell electrode; and wherein said second material is present in an amount to cause said selected state of charge level to be between about 0.05 state of charge and about 0.95 state of charge, and wherein said second material is disposed as a second phase within the first material.

2. The electrode of claim 1, wherein said electrode is an anode electrode.

3. The electrode of claim 1, wherein said observable change in measured potential comprises a step change in potential.

4. The electrode of claim 1, wherein said first material comprises carbon, in the form of hard non-graphitizable carbon, soft carbon graphitizable upon heating or graphite.

5. The electrode of claim 1, wherein said electrode is an anode electrode in a battery cell complementary to a cathode electrode.

6. The electrode of claim 5, wherein said cathode electrode comprises lithium metal oxides comprising cobalt, nickel, or manganese.

7. The electrode of claim 1, wherein said first material comprises $Li_yC_6$ where $0<Y<1$.

8. The electrode of claim 7, wherein said second material transfers Li ions upon exhaustion of the first material at a selected level of discharge.

9. The electrode of claim 1, wherein said second material is disposed as a second phase is not interconnected.

10. A battery cell electrode comprising:
a first material constructed and arranged to be charged and discharged and having a first potential versus state of charge relationship;
a second material comprising $Li_{4+3z}Ti_5O_{12}$ wherein $0<Z<1$ and having a second potential versus state of charge relationship;
wherein said second material is constructed and arranged to become active to transfer ions at a selected state of charge level to produce an observable change in measured potential from said first to said second potential versus relationship, and wherein the amount of the second material ranges from about 2 to about 30 weight percent of the battery cell electrode; and wherein said second material is present in an amount to cause said selected state of charge level to be between about 0.05 state of charge and about 0.95 state of charge wherein said electrode is an anode electrode in a battery cell complementary to a cathode electrode comprising iron phosphate wherein said cathode electrode comprises $Li_xFePO_4$ wherein $0<X<1$, wherein said second material is disposed as a second phase within the first material.

11. The electrode of claim 10, wherein said observable change in measured potential comprises a step change in potential.

12. The electrode of claim 10, wherein said first material comprises carbon, in the form of hard non-graphitizable carbon, soft carbon graphitizable upon heating or graphite.

13. The electrode of claim 10, wherein said first material comprises $Li_yC_6$ where $0<Y<1$.

14. The electrode of claim 13, wherein said second material transfers Li ions upon exhaustion of the first material at a selected level of discharge.

15. The electrode of claim 12, wherein the $Li_{4+3z}Ti_5O_{12}$ wherein $0<Z<1$ has a capacity of about 0.25 mAh and the graphite has a capacity of about 0.95 mAh, while the iron phosphate has a capacity of about 1.1 mAh, thus making an energy content of the electrode about 10% excess.

16. The electrode of claim 10, wherein said second material is disposed as a second phase is not interconnected.

* * * * *